March 30, 1971        B. W. ELLIOTT        3,573,125
EXTRUSION-COATING OF ETHYLENE-VINYL ACETATE COATINGS
Filed April 29, 1968
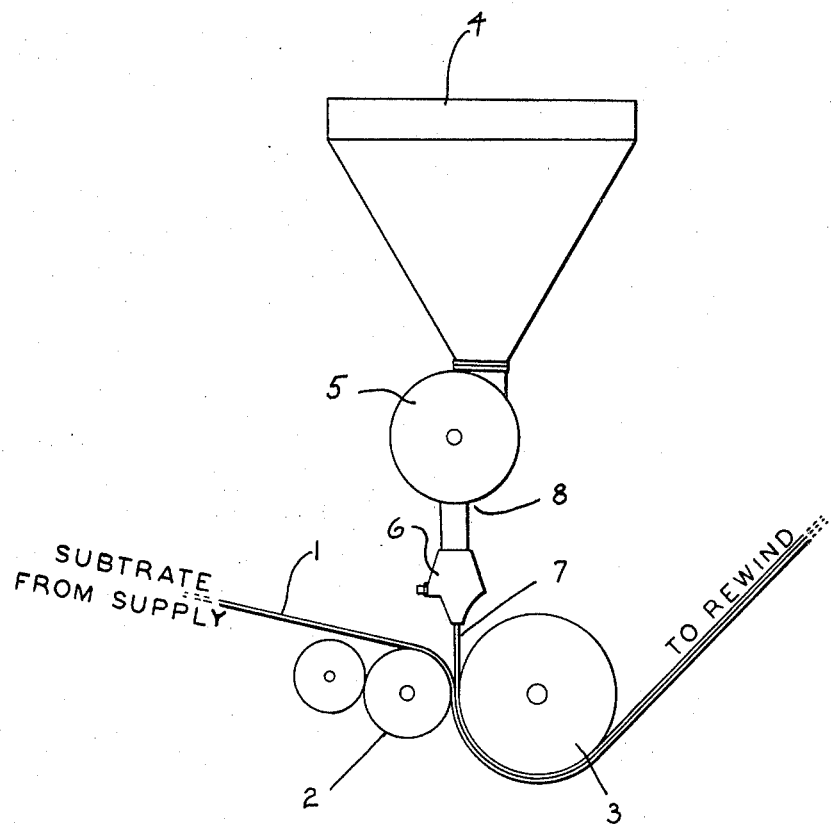
INVENTOR
BENTLEY W. ELLIOTT
BY
ATTORNEY

United States Patent Office 3,573,125
Patented Mar. 30, 1971

3,573,125
EXTRUSION-COATING OF ETHYLENE-VINYL
ACETATE COATINGS
Bentley W. Elliott, Milwaukee, Wis., assignor to
Milprint, Inc., Milwaukee, Wis.
Continuation-in-part of application Ser. No. 639,381,
May 18, 1967. This application Apr. 29, 1968, Ser.
No. 734,828
Int. Cl. B29b 3/00
U.S. Cl. 156—244                                        9 Claims

ABSTRACT OF THE DISCLOSURE

An extrusion-coating process for the application of coatings of wax and ethylene-vinyl acetate copolymers, or the copolymers by themselves, onto substrate films, instead of the usual hot melt or solvent coating techniques for the application of such coatings. An especially effective primer for use with the coatings is also shown.

This application is a continuation-in-part of application Ser. No. 639,381, filed May 18, 1967, now abandoned.

BACKGROUND OF THE INVENTION

(1) Field

This invention relates to the art of coating blends of wax and ethylene-vinyl acetate copolymers or the copolymers alone onto substrates, to the coated substrates formed thereby, and to a primer for use with the coatings, all as especially related to the production of flexible packaging materials.

(2) Prior art

Coatings comprising basically ethylene-vinyl acetate and wax have been well-known in the packaging field for many years, the blends finding principle use as substitutes or replacements for wax-coated packaging materials. For example, U.S. Patent 2,877,196 shows compositions of up to 20% ethylene-vinyl acetate copolymer and 80% or more microcrystalline or paraffin wax; 3,025,-167 discloses mixtures of 30%–50% ethylene-vinyl acetate and 50%–70% microcrystalline wax, which may also contain specified resinous modifiers to form a heat sealable coating; and 3,175,986 advocates a coating composition for carton blanks of 25%–40% ethylene-vinyl acetate, 12%–30% microcrystalline wax, and 3%–10% terpene resins, with any balance principally paraffin wax.

The last two of the foregoing patents mention suitable application methods, 3,025,167 stating that the coatings can be applied as hot melts and 3,175,986 specifying that its disclosed coatings were applied by dipping carton board in the melted coatings. It is also known to apply coatings of this or similar nature by dispersing the ethylene-vinyl acetate, wax and other ingredients in a suitable solvent and then evaporating the solvent after deposition of the coating onto the desired substrate.

It is considered accurate to state that the coating art as related to the application of coatings containing ethylene-vinyl acetate copolymers blended with wax has taught that they must be applied by hot melt techniques (which is used herein broadly enough to refer to dipping) or by solvent coating techniques. This is borne out in an article published in Modern Packaging for May 1966, entitled "New Class of Polyolefins," Southwick and Winship, which stated at page 158:

"Although extrudable, high-molecular weight EVA's are now available from at least three resin producers and EVA film is being widely used in packaging—both as an unsupported film and in laminate form—it is important to note that EVA is not as thermally stable as the familiar homopolymers and that it cannot, therefore, be extrusion coated."

The EVA mentioned above is ethylene-vinyl acetate copolymer.

SUMMARY OF THE INVENTION

In contradistinction to the prior art as related above, this invention is based upon the discovery that EVA/wax and EVA coatings can be extrusion coated if the following conditions are observed:

(1) The EVA used in the coatings has a melt index within the range of about 0.3 to 20, as determined according to the procedure outlined in ASTM D1238–62T, Measuring Flow Rates of Thermoplastics by Extrusion Plastometer.

(2) The extrusion coating is carried out within the critical temperature range of 190° to 300° F. in the case of EVA/wax coatings when the EVA has a melt index of 1.2 or above, 300° F. to 350° F. with EVA/wax coatings when the EVA has a melt index under 1.2, and 300° F. to 450° F. in the case of 100% EVA coatings. If the foregoing conditions are observed, it has now been found that compositions from 100% EVA and blends of 30% to 99% EVA and 1% to 70% wax can be successfully extrusion coated onto various substrates including paper, aluminum foil, glassine, cellophane, polyethylene, polypropylene, polyester film (polyethylene terephthalate) etc. It was noted in the case of the EVA/wax blends that neither EVA with a melt index of 1.2 or higher nor wax can be extrusion coated by themselves within the temperature range of 190° F. to 300° F., but the two ingredients when combined can be extruded within such range. It has also been found that the process of this invention enables the application of EVA/wax coatings with a higher percentage of EVA than is possible with either hot melt or solvent coating techniques.

In another aspect of this invention, a terpolymer of ethylene/vinyl acetate/acrylic acid has been discovered to be an unusually effective primer for combination with coatings of the above compositions when they are applied to substrates of the type which require primers in order to obtain good adhesion of the coating to the substrate.

Among the main objects of this invention are to provide a new method for the application of EVA and EVA/wax coatings, to wit, extrusion coating, which has heretofore not been thought applicable to such compositions; another is to device suitable composition and operating parameters which are necessary to successfully apply the coatings by extrusion coating techniques; and yet another is to provide an advantageous primer composition for use with the above coatings. One of the specific objects of this invention is to provide new or improved details of composition and/or method hereinafter claimed.

The coatings extruded in the practice of this invention may be used as exterior functional coatings, it being possible to produce coatings which can be heat sealed at relatively low temperatures, and they may also be used as interior coatings in laminating together two webs of the same or dissimilar materials.

DRAWINGS

The figure is a schematic representation of a typical extrusion-coating apparatus such as may be used in the practice of this invention.

DESCRIPTION OF PREFERRED EMBODIMENTS

The present invention will be more fully understood with reference to the following examples which illustrate several modes for the practice of this invention within the limits stated above. These examples should not be regarded in the limiting sense but, instead, as illustrative of presently-preferred modes for the practice of this invention. Unless stated otherwise, the term "parts" refers to parts by weight and the various percentages of the compositions are on a weight basis.

The figure schematically represents a portion of a typical extrusion coating line which may be used for the process of this invention. A web of substrate 1 advances through the nip between a pressure roll 2 and chill roll 3 and thence around the lower portion of the chill roll onto suitable rewind apparatus not shown. The coating to be applied to the advancing substrate is supplied through the hopper 4 into the barrel 5 of an extruder wherein it is melted by heat and mechanical work and forced through a die 6 under pressure as a curtain 7 of molten material onto the substrate 1 as indicated. The pressure roller aids in achieving good contact and strong adhesion between the coating and the substrate. The extrusion temperatures referred to hereafter are measured at the exit end of the barrel 5 of the extruder where the material leaves the barrel to flow into the die, and this point of temperature measurement is indicated by the reference numeral 8 in the drawing.

The following examples illustrate the types of coatings which can be extrusion-coated according to this invention.

Example 1

A coating of 40 parts ethylene-vinyl acetate copolymer with a melt index of 1.2 and having 27% to 29% vinyl acetate and the balance ethylene, and 60 parts microcrystalline wax with a melting point of 160° F.–165° F. was extruded on substrates with an apparatus as illustrated in the figure. The temperature of the extrusion, measured at the exit end of the extruder as shown by the numeral 8 in the figure, was 260° F.

Example 2

A coating composition consisting of 50 parts ethylene-vinyl acetate copolymer, having a melt index of about 18, and 50 parts microcrystalline wax with melting point 165° F. to 170° F. was extruded onto a substrate at an extruder exit temperature of 260° F.

Example 3

Sixty parts of the ethylene-vinyl acetate copolymer of Example 1 was blended with 40 parts of the microcrystalline wax and extruded at an exit temperature of 260° F.

Example 4

A coating mixture of 99 parts of the ethylene-vinyl acetate copolymer of Example 1 was blended with 1 part of the microcrystalline wax of Example 1 and extruded onto a substrate at an exit temperature of 300° F.

Example 5

A coating composition was prepared from 55 parts of an EVA copolymer with a melt index of 0.5 (containing 28% vinyl acetate and the balance ethylene), 37½ parts of the microcrystalline wax of Example 1, and the balance pentaerythritol tetrastearate and glyceryl ester of rosin (Ester Gum 8D). The composition was satisfactorily extrusion-coated at a temperature of 325° F.

The following examples illustrate that the entire coating composition need not be only wax and EVA but may contain up to 25% of other materials used in the production of heat sealable coatings for packaging films.

Example 6

A coating mixture of 48 parts of the ethylene-vinyl acetate copolymer of Example 1, 12 parts of a terpolymer comprising ethylene-vinyl acetate-acrylic acid (with approximately 1% acrylic acid, 28% vinyl acetate, and the balance ethylene), and 40 parts microcrystalline wax with a melting point 160° F.–165° F. was extruded at an exit temperature of 260° F. onto a substrate.

Example 7

A coating consisting of 45 parts of the EVA of Example 1, 54 parts paraffin wax (melting point 165° F.) and 1 part glyceryl ester of rosin (Ester Gum 8D) was extrusion-coated at a temperature of 260° F.

Example 8

A coating consisting of 35 parts of the EVA copolymer of Example 1, 25 parts of polyterpene resin and 40 parts paraffin wax with a melting point 165° F. was extrusion-coated at a temperature of 240° F.

Example 9

A coating was prepared from 55 parts of an ethylene-vinyl acetate copolymer with a melt index of 5.0 and having 28% vinyl acetate and the balance ethylene, 37.5 parts of a microcrystalline wax with a melting point of 165° F., 7 parts polyterpene resin, and 0.5 part pentaerythritol tetrastearate. The coating was applied to a glassine substrate by extrusion coating using an exit temperature of 210° F. to yield a firmly adherent, heat sealable coating. The same composition was also satisfactorily extrusion coated at an exit temperature of 220° F.

Example 10

A coating was compounded with 35 parts of an ethylene-vinyl acetate copolymer with a melt index of 1.5 and containing 28% vinyl acetate and the balance ethylene, 40 parts of a paraffin wax with a melting point of 165° F., and 25 parts of a styrene copolymer ("Piccotex 120"). The coating was applied to a glassine substrate by extrusion coating at an exit temperature of 200° F. to yield a heat sealable coating firmly bonded to the substrate.

The following example illustrates the use of coatings of 100% EVA copolymer.

Example 11

A coating of 100 parts of an EVA copolymer of the composition of Example 1 but with a melt index of 5.0 was satisfactorily extrusion-coated onto a substrate at a temperature of 350° F. The same coating was also satisfactorily extrusion-coated at 300° F. Another EVA copolymer of the same composition and melt index was extrusion coated onto glassine at exit temperatures of 400° F. and 450° F. and yielded satisfactory coated packaging films.

Example 12

Coatings according to the preceding examples were extrusion-coated onto substrates which were first coated with a primer coating comprising a terpolymer of ethylene-vinyl acetate-acrylic acid applied as 10% solids in a toluene solution at a dry weight of 0.01 to 1.0 pounds per ream (3,000 sq. feet) of substrate, depending on the surface characteristics of the substrate. Application of said primer at dry weights between 0.3 and 0.5 pound per ream is about optimum for saran coated cellophane, polypropylene, polyethylene and polyethylene terephthalate films. This primer coating was found to provide strong adhesion of the coating to substrates such as aluminum foil and untreated polyolefins, including polyethylene and polypropylene, to which the coatings would not adhere in the absence of some surface pretreatment such as electronic corona discharge treatment in the case of the polyolefin films. A primer of this composition is satisfactory for obtaining strong adhesion of coatings to any type of substrate. Terpolymers suitable for the primer coating will include 1% to 5% acrylic acid, 20%–30% vinyl-acetate and the balance ethylene.

In the preceding examples, the coatings were applied to the substrates at a coating weight of 7.0 to 20.0 pounds of coating per ream of substrate (3,000 sq. feet). Various substrates were used, including thermoplastic films such as polyethylene, polypropylene and polyethylene terephthalate; aluminum foil films; cellulosic films such as cellophane, cellulosic esters, and glassine; and paper. The coatings consisting of a mixture of ingredients were admixed as dry blends and then fed into the extruder for subsequent melting and application.

Coatings produced according to the foregoing examples when applied to substrates commonly used in the packaging materials, such as paper, plastic films, and aluminum foil approximately ½ to 5 mils thick, form heat sealable functional coatings on the exterior of the films. Such coatings will heat seal at approximately 100° F. below the heat sealing temperature of an equivalent thickness of polyethylene; the coatings generally can be heat sealed as low as 190° F. This means that less heat will be transmitted to the product packaged in the film and that increased production speeds can be attained. In this latter connection, with a sample run of instant tea packages, production speed was increased from 84 packages per minute to 102 packages per minute by changing to the use of low temperature heat sealed coated films made according to this invention. The clarity of the coatings is good to fair with a slight haze characteristic which renders it suitable for most packaging uses, although its clarity is not as great as that of cellophane for example. Generally, the transparency of the coatings increases as the percentage of copolymer increases. The coatings seal through and around small particles so that the coated films or packages made from such coated films are particularly useful in the packaging of dry dusty products such as instant coffee, instant tea, instant potatoes etc.; dry dusty products of this nature tend to contaminate seal areas and impair sealability with other types of coatings, but not with the coatings of this invention. Because of the low heat sealing temperature, the coated films are particularly useful in wrapping candy. The coatings heat seal well to most materials such as polyethylene, polystyrene, and coated or uncoated aluminum foils, and thus the coatings efficaciously may be used to form heat sealable lids for use in conjunction with trays or other type of containers formed from such materials. Within the coating weight range mentioned above, coatings at least ½ mil thick are satisfactory, and at least a ¾ mil thickness has been found especially useful for the foregoing types of uses.

In comparing the coatings blended with the microcrystalline wax with those blended with paraffins, the microcrystalline wax blends have greater usefulness in that they form a coating which is less brittle, has higher strength and greater extensibility than the coatings formed with paraffin wax. Also, microcrystalline wax gives a higher hot strength than does paraffin wax when the coating is melted during heat sealing, and the microcrystalline wax blends are easier to run on extrusion-coating apparatus than the paraffin blends. The microcrystalline waxes to be used with the coatings of this invention should have melting points of about 160° F. to 195° F., preferably 160° F. to 180° F., and are petroleum waxes consisting chiefly of mixtures of isoparaffins, naphthenes and small amounts of aromatic and straight chain hydrocarbons. Such waxes are separated by solvent recrystallization from the non-distillable pot or still residue obtained as a result of the fractional distillation of the petroleum. They have higher molecular weights and boiling points than paraffin wax. The paraffin waxes which may be utilized should have a melting point of 135° F. to 165° F. and are usually obtained from the overhead wax distillate fractions of petroleum. Of course, blends of the two types of waxes may be utilized.

It is important that the EVA copolymer used in the preceding coatings have a melt viscosity within the range of 0.3 to 20 melt index, as determined by ASTM method D1238–62T. Within the broad melt index range of 0.3 to 20, EVA copolymers with a melt index of 1.2 or higher have been found particularly advantageous for the practice of this invention. Copolymers with this melt index can be extrusion-coated at the lower temperature range of 190° F. to 300° F. when blended with wax, whereas copolymers with a melt index from 0.3 up to 1.2 require extrusion-coating at 300° F. to 450° F. and are difficult to blend with wax. Also, copolymers with a melt index from 1.2 to 20 are easier to handle and easier to blend with waxes and other ingredients which may be used in the coatings than copolymers with a melt index under 1.2. Thus copolymers within the 1.2 to 20 melt index range are the most commercially useful materials for the practice of this invention, and those with the melt index between about 1.2 and 5.0 are considered particularly advantageous. On the other hand, if the melt viscosity of the copolymers exceeds a melt index of 20, its viscosity is too low for successful extrusion-coating. Thus for the application of EVA/wax blends, the process of this invention has two facets: (1) extrusion-coating at temperatures of 190° F. to 300° F. for EVA copolymers with a melt index of 1.2 to 20 and (2) extrusion-coating at temperatures of 300° F. to 350° F. for EVA copolymers with a melt index of 0.3 to 1.2.

Suitable ethylene-vinyl acetate copolymers are available commercially from several sources, and are normally made by copolymerizing ethylene and vinyl acetate in a suitable reactor at high pressures (e.g. 15,000 to 30,000 p.s.i.g.) and at temperatures on the order of 150° C. to 250° C., in the presence of a peroxide catalyst such as tert-butyl hydroperoxide. The quantity of polymerized vinyl acetate in the copolymer is controlled principally by the vinyl acetate content of the monomeric mixture. The melt index of the copolymers is obtained by varying the conditions of pressure, temperature and catalyst concentration in accordance with known technological methods. The most useful EVA copolymers generally will vary in composition with ethylene:vinyl acetate ratios between about 4:1 to about 2:1, providing copolymers with between 20% to 35% by weight vinyl acetate. The EVA copolymer in the coatings should contain at least 95% ethylene and vinyl acetate, but can contain up to 5% of acrylic acid as a third comonomer. Thus terpolymers of 20% to 35% vinyl acetate, 0.1% to 5% acrylic acid, and the balance ethylene are satisfactory as the copolymer ingredient. Within these ranges, a terpolymer of 28% to 30% vinyl acetate, 1% acrylic acid and the balance ethylene is considered especially effective.

The extrusion-coating process for the application of EVA and EVA/wax coatings in accordance with this invention has important advantages over the hot melt and solvent coating systems taught by the prior art for such materials. The extrusion-coating process herein allows the application of coatings having very high viscosities, such as in the range of around 200,000 centipoises; in contrast, hot melt curtain coaters have viscosity limitations and can only handle materials with viscosities up to about 60,000 centipoises at the most. This viscosity limitation of the hot melt coating technique means that it cannot be used to apply coatings containing 30% or more of the higher molecular weight copolymers which have viscosities in excess of the hot melt limits. However, the extrusion-coating technique herein disclosed allows the utilization of EVA coatings with the higher molecular weight copolymers and also allows the use of a higher percentage of copolymer in the coating than is possible with the hot melt technique. In this latter connection, it is not possible generally to obtain a level of 50% to 70% copolymer in a blend which is applied by hot melt technique, but such compositions can be applied readily with the present extrusion-coating process. In comparison to solvent systems, the present extrusion-coating technique eliminates the problems attendant upon the removal of solvent after the coating has been applied to a substrate and those involving odor problems brought about by the normally inescapable retention of some portion of the solvent in the dried coating.

Also, the temperatures for the instant extrusion-coating process are about 100° F. lower than those normally used on hot melt coaters, and the types of coatings produced by the instant extrusion-coating technique would be subject to severe thermal degradation if their application was attempted on a conventional hot melt coater because such would require the use of extremely high temperatures.

The coatings to be applied by the method of this invention need not be entirely EVA or EVA blended with wax, but should constitute at least 75% of either EVA or EVA plus wax. This allows the addition of up to 25% of other ingredients such as materials commonly used in the coating field to impart or enhance specific properties, e.g. slip agents, anti-block compounds, hot tack resins, etc. For example, the glyceryl ester of rosin mentioned in a preceding example is blended with the coating to improve hot tack and thereby aid in having the coating adhere well to the substrate during the extrusion coating process and also aid in achieving formation of a good heat seal with the finished material. Polyterpene resins may be used for the same purpose. Pentaerythritol tetrastearate has been found to be an effective anti-block agent for compounding with these coatings. Slip agents such as carnauba wax and clay suspensions can also be incorporated within this specified fraction of the coating. Although .1 to 25%, or up to 25%, of the total coating is considered the broad range within which these additional ingredients can be added, past experience has shown that up to 10% of such ingredients yields the most effective and useful coatings. Thus within the broad range, the narrower proportion of coatings containing at least 90% EVA or EVA with wax, and up to 10% of other ingredients is considered the most workable to provide coatings useful in packaging film uses.

It is to be understood that it is intended to cover all changes and modifications of the examples of this invention herein chosen for the purpose of illustration which do not constitute a departure from the spirit and scope of this invention.

I claim:
1. An extrusion-coating method for the application to a substrate of a coating containing ethylene-vinyl acetate copolymer having 20 to 35% vinyl acetate and the balance ethylene up to at least 95% of the weight of the copolymer, comprising the steps of
   (1) blending a solventless coating composition containing (A) 100% of said ethylene-vinyl acetate copolymer, or (B) 30 to 99% of said ethylene-vinyl acetate copolymer and 1% to 70% wax, in which
      (a) the copolymer has a melt index between about 0.3 and 20, and
      (b) the wax is microcrystalline wax with a melting point of 160° F. to 195° F., paraffin wax with a melting point of 135° F. to 165° F., or a mixture thereof,
   (2) melting the coating composition in the extruder of an extrusion-coating apparatus, which extruder has an exit leading to an extrusion die,
   (3) extruding the molten coating composition through the extruder die onto a substrate at a temperature, measured at the exit of the extruder, of
      (a) 190° F. to 350° F. in the case of coating compositions containing ethylene-vinyl acetate copolymer and wax, and
      (b) 300° F. to 450° F. in the case of coating compositions containing 100% of the copolymer.

2. An extrusion-coating method for the application to a substrate of a coating containing ethylene-vinyl acetate copolymer having 20 to 35% vinyl acetate and the balance ethylene up to at least 95% of the weight of the copolymer, comprising the steps of
   (1) introducing a solventless coating composition containing 100% of said ethylene-vinyl acetate copolymer into the extruder of an extrusion-coating apparatus, which copolymer has a melt index between about 0.3 and 20,
   (2) melting the coating composition in the extruder, which extruder has an exit leading to an extrusion die, and
   (3) extruding the molten coating composition through the extruder die onto a substrate at a temperature, measured at the exit of the extruder, of 300° F. to 450° F.

3. An extrusion-coating method according to claim 2 wherein
   a primer coating of ethylene-vinyl acetate-acrylic acid terpolymer is applied to the substrate before the molten coating composition is extruded thereon, the primer being present at a coating weight of 0.01 to 1.0 pound per 3,000 square feet of surface area of the substrate.

4. An extrusion-coating method according to claim 2 wherein
   the ethylene-vinyl acetate copolymer has a melt index of about 1.2 to 5.0.

5. An extrusion-coating method for the application to a substrate of a coating containing ethylene-vinyl acetate copolymer having 20 to 35% vinyl acetate and the balance ethylene up to at least 95% of the weight of the copolymer comprising the steps of
   (1) introducing a solventless coating composition containing 30% to 99% of said ethylene-vinyl acetate copolymer and 1% to 70% wax into the extruder of an extrusion-coating apparatus, in which
      (a) the copolymer has a melt index between about 0.3 and 20, and
      (b) the wax is microcrystalline wax with a melting point of 160° F. to 195° F., paraffin wax with a melting point of 135° F. to 165° F., or a mixture thereof,
   (2) melting the coating composition in the extruder, which extruder has an exit leading to an extrusion die,
   (3) extruding the molten coating composition through the extruder die onto a substrate at a temperature, measured at the exit of the extruder, of 190° F. to 350° F.

6. An extrusion-coating method according to claim 5 wherein
   a primer coating of ethylene-vinyl acetate-acrylic acid terpolymer is applied to the substrate before the molten coating composition is extruded thereon, the primer being present at a coating weight of 0.01 to 1.0 pound per 3,000 square feet of surface area of the substrate.

7. An extrusion-coating method according to claim 5 wherein
   the ethylene-vinyl acetate copolymer used in the coating composition has a melt index of about 1.2 to 5.0, and
   such coating composition is extruded at a temperature of 190° F. to 300° F.

8. An extrusion-coating method according to claim 7 wherein
   the wax blended with the ethylene-vinyl acetate copolymer is microcrystalline wax with a melting point of 160° F. to 180° F.

9. An extrusion-coating method according to claim 7 wherein
   a primer coating of ethylene-vinyl acetate-acrylic acid terpolymer is applied to the substrate before the molten coating composition is extruded thereon, the primer being present at a coating weight of 0.01 to 1.0 pound per 3,000 square feet of surface area of the substrate.

References Cited
UNITED STATES PATENTS 3,381,717　5/1968　Tyrrel _____ 156—244X
3,411,981　11/1968　Thomas _____ 156—244X BENJAMIN R. PADGETT, Primary Examiner S. J. LECHERT, Jr., Assistant Examiner U.S. Cl. X.R.

156—306; 117—47; 264—176

PO-1050
(5/69)

UNITED STATES PATENT OFFICE
CERTIFICATE OF CORRECTION

Patent No. 3,573,125                     Dated March 30, 1971

Inventor(s) Bentley W. Elliott

It is certified that error appears in the above-identified patent and that said Letters Patent are hereby corrected as shown below:

Column 1, line 65, "Southwick and Winship," should read --Shaw,--.

Signed and sealed this 26th day of October 1971.

(SEAL)
Attest:

EDWARD M. FLETCHER, JR.            ROBERT GOTTSCHALK
Attesting Officer                  Acting Commissioner of Paten